Patented Mar. 17, 1925.

1,530,021

UNITED STATES PATENT OFFICE.

ALBRECHT THIELE, OF BERLIN, GERMANY, ASSIGNOR TO CHEMISCHE FABRIK AUF ACTIEN (VORM. E. SCHERING), OF BERLIN, GERMANY.

PHARMACEUTICAL PRODUCT.

No Drawing.　　　Application filed May 18, 1923. Serial No. 639,974.

*To all whom it may concern:*

Be it known that I, ALBRECHT THIELE, citizen of Germany, residing at Berlin, Germany, have invented a new and useful Improvement in Pharmaceutical Products, of which the following is a specification.

The invention relates to the preparation of a new pharmaceutical product which is formed by melting together 4-dimethylamino-2.3-dimethyl-1-phenyl-5-pyrazolon with dipropylbarbituric acid. The product is of yellow colour, melts at about from 82° to 86° centigrade and is soluble in water especially when warmed, and in alcohol, ether and acetone. It is marked by valuable therapeutical properties, particularly by excellent analgesic effects.

This product which must be supposed to be an addition-compound is prepared by melting together 4-dimethylamino-2.3-dimethyl-1-phenyl-5-pyrazolon with dipropylbarbituric acid in such a manner as to avoid decomposition, at a temperature not exceeding about 125° centigrade. Thus two molecules of 4-dimethylamino-2.3-dimethyl-1-phenyl-5-pyrazolon and one molecule of dipropylbarbituric acid are combined. It is desirable therefore to melt together the two compounds in the above stated ratio, though one is not bound to it.

To perform the method of preparation one proceeds for instance as follows:

Two molecules of 4-dimethylamino-2.3-dimethyl-1-phenyl-5-pyrazolon are heated with one molecule of dipropylbarbituric acid while the mixture is being well stirred, to a temperature of about 100° centigrade until the compounds have been melted to a yellow liquid. The melted mass is filtered off while hot and then is allowed to freeze.

I claim as my invention:

1. As a new article of manufacture a product consisting of 4-dimethylamino-2.3-dimethyl-1-phenyl-5-pyrazolon and dipropylbarbituric acid melted together.

2. As a new article of manufacture a product consisting of two molecules of 4-dimethylamino-2.3-dimethyl-1-phenyl-5-pyrazolon and one molecule of dipropylbarbituric acid, melting at about from 82° to 86° centigrade being soluble in water especially when warmed, in alcohol, ether and acetone, and possessing strong analgesic properties.

In testimony whereof I have hereunto set my signature in the presence of two subscribing witnesses.

DR. ALBRECHT THIELE.

Witnesses:
E. HOLZERMAN,
ROGER T. AUGRIVE.